US007008974B2

(12) United States Patent
Cho et al.

(10) Patent No.: US 7,008,974 B2
(45) Date of Patent: *Mar. 7, 2006

(54) COMPOSITION FOR PREPARING RIGID POLYURETHANE FOAM HAVING GOOD DEMOLDING PROPERTY

(75) Inventors: Hyun-Keun Cho, Changwon (KR); Ju-Hyun Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/490,614

(22) PCT Filed: Sep. 27, 2002

(86) PCT No.: PCT/KR02/01820

§ 371 (c)(1),
(2), (4) Date: Mar. 25, 2004

(87) PCT Pub. No.: WO03/027161

PCT Pub. Date: Apr. 3, 2003

(65) Prior Publication Data

US 2004/0192802 A1    Sep. 30, 2004

(30) Foreign Application Priority Data

Sep. 28, 2001   (KR) ............................... 2001-60714

(51) Int. Cl.
*C08G 18/28*   (2006.01)

(52) U.S. Cl. ............ 521/130; 521/131; 521/164; 521/167; 521/170; 521/172; 521/173; 521/174; 521/176

(58) Field of Classification Search ........... 521/130, 521/131, 167, 170, 172, 173, 174, 176, 164, 521/169

See application file for complete search history.

(56) References Cited

U.S. PATENT DOCUMENTS

| | | | |
|---|---|---|---|
| 4,866,102 A | | 9/1989 | Pray et al. |
| 5,173,517 A | | 12/1992 | Kuroishi et al. |
| 5,340,916 A | * | 8/1994 | Henn et al. .................. 528/405 |
| 5,684,057 A | * | 11/1997 | White et al. ................. 521/167 |
| 5,919,395 A | * | 7/1999 | Bastin et al. ........... 252/182.24 |
| 6,201,033 B1 | * | 3/2001 | Mercando et al. .......... 521/129 |
| 6,232,356 B1 | * | 5/2001 | Mercando et al. .......... 521/129 |
| 6,420,446 B1 | * | 7/2002 | Chang ......................... 521/172 |
| 6,861,454 B1 | * | 3/2005 | Kim ............................ 521/173 |

FOREIGN PATENT DOCUMENTS

| | | |
|---|---|---|
| DE | 19502578 | 8/1996 |
| DE | 19623065 | 12/1997 |
| JP | 04351620 | 12/1992 |
| JP | 6-107761 | 4/1994 |
| JP | 8-269154 | 10/1996 |
| JP | 9-40736 | 2/1997 |

OTHER PUBLICATIONS

German Office Action with English language translation dated May 19, 2005.

* cited by examiner

*Primary Examiner*—John M. Cooney, Jr.
(74) *Attorney, Agent, or Firm*—Fleshner & Kim, LLP

(57) ABSTRACT

Disclosed is a composition for preparing a rigid polyurethane foam having a good demolding property by defining polyol component and catalyst component. The polyol component comprises 40~60 wt. % of polyol obtained by polymerization with an organic oxide using sorbitol as an initiator, 5~10 wt. % of polyol obtained by polymerization with an organic oxide using ethylene diamine as an initiator, 20~30 wt. % of polyol obtained by polymerization with an organic oxide using toluene diamine or toluene diamine and triethanol amine as a single or a complex initiator, and, optionally, 5~20 wt. % of multivalent polyol of an ester structure, and the catalyst component is chosen in a group comprising a foaming catalyst, a gelling catalyst, a trimerization catalyst, a mixed form of the foaming catalyst and the gelling catalyst, and compound thereof.

10 Claims, No Drawings

COMPOSITION FOR PREPARING RIGID POLYURETHANE FOAM HAVING GOOD DEMOLDING PROPERTY

TECHNICAL FIELD

The present invention relates to a rigid polyurethane foam composition, and particularly, to a composition for preparing a rigid polyurethane foam having superior demolding property by defining polyols and reaction catalysts, and reducing post-expansion rate after foaming without damaging other physical properties.

BACKGROUND ART

Generally, a rigid polyurethane foam is obtained by reacting a polyol component and an isocyanate component under existences of reaction catalysts, a foam blowing agent and a foam stabilizer. The rigid polyurethane foam is a heat insulating material having the highest heat insulating property among organic and inorganic thermal insulators, and is used a lot in a refrigerator, a freezing container, a low temperature storage, etc. which require a higher heat insulating property. That is because the polyurethane foam consists of closed cells to have a higher heat insulating property, and a low density foam can be prepared by controlling a used amount and kind of the foam blowing agent. However, a polyurethane foam having lower density and thermal conductivity than that usually used, and having a good plasticity is highly required.

Generally, the rigid polyurethane foam is needed to be hardened in a foaming jig (mold) under a predetermined temperature range (40° C.~55° C.) for a predetermined time after a raw solution is injected. In addition, a difference in post-expansion rate when demolding in the jig is generated according to the hardening time. The post-expansion rate after foam blowing of the polyurethane foam is directly related to size and changing amount of the refrigerator products, and basically, the amount of post-expansion after the foam blowing is increased in proportion to the size and thickness.

However, as the produced amount of the refrigerator is increased, as structure and size of the product become complex and large, and as quality control of the products becomes rigid, it is required that the expansion rate of the foam and the hardening time are reduced. However, it can not be realized by the conventional polyurethane foam, and the number of jig is increased, and thereby, the producing cost is increased.

DETAILED DESCRIPTION OF THE INVENTION

Therefore, it is an object of the present invention to provide components of raw solution having improved demolding property and to provide composition for preparing a rigid polyurethane foam including the same by minimizing post-expansion rate in demolding from a jig (mold), as maintaining physical properties and characteristics (heat insulating function, density, dimensional changing rate, compression intensity, etc.) required as a thermal insulating material to be same level.

To achieve the above object of the present invention, there is provided composition for preparing a rigid polyurethane foam having superior demolding property with minimized post-expansion rate in demolding, by controlling components and contents of polyols and reaction catalysts in the composition for the rigid polyurethane comprising reaction catalysts, a chemical foam blowing agent (water), a physical foam blowing agent (HCFC-141b), an isocyanate, and a few important polyols.

The composition for preparing a rigid polyurethane according to the present invention comprises following components:

a mixed polyol 100 weight parts comprising 40~60 wt. % of polyol (a) which is obtained by polymerization with alkylene oxide using sorbitol as an initiator, 5~10 wt. % of polyol (b) which is obtained by polymerization with alkylene oxide using ethylene diamine as an initiator, 20~30 wt. % of polyol (c) which is obtained by polymerization with alkylene oxide using toluene diamine or a mixture of toluene diamine and triethanol amine as a single or complex initiator, and 5~20 wt. % of multivalent polyol of an ester structure, on a basis of total weight of mixed polyol (herein, the amount of each polyol is determined within the above each range so that total wt. % of polyols a, b, c and d could amount to 100), 1.6~3.5 weight parts of reaction catalysts, 10~50 weight parts of a foam blowing agent, 1.5~2.5 weight parts of water, and 150~170 weight parts of organic isocyanates.

Also, the present invention relates to a rigid polyurethane foam fabricated from the above composition for the rigid polyurethane foam.

The present invention uses a mixed polyol of a certain composition, reaction catalyst, and the foam blowing agent such as a certain amount of water and HCFC-141b. The rigid polyurethane foam obtained from above composition according to the present invention has a low post-expansion rate after demolding as maintaining other physical properties such as thermal insulating function, etc., and therefore, has a superior plasticity. Therefore, it is very useful for applying to the refrigerator.

Most polyols used in general rigid polyurethane are polyhydric alcohol having an ether structure (C—O—C), and these are obtained by polymerization with an organic oxide using a compound having two or more active hydrogen as an initiator.

In case that general alkylene oxide (AO) is used as the above organic oxide, ethylene oxide (EO), propylene oxide (PO) and a mixture thereof are used in general, and these can be used in the present invention.

The mixed polyol used in the present invention consists of a polyol which is obtained by polymerization with an alkylene oxide using sorbitol of hexa-valent functional group as an initiator (polyol a), a polyol which is obtained by polymerization with an alkylene oxide using ethylene diamine (EDA) of tetra-valent of functional group as an initiator (polyol b), a polyol which is obtained by polymerization with an alkylene oxide using toluene diamine (TDA) of tetra-valent functional group as a single initiator or a mixture of TDA and triethanol amine (TEOA) of tri-valent functional group as a complex initiator (polyol c), and a multivalent polyol having an ester structure (C—O—O) (polyol d).

It is desirable that the component content of the mixed polyol in the present invention is 40~60 wt. % of polyol a using the sorbitol as an initiator, 5~10 wt. % of polyol b using EDA as an initiator, 20~30 wt. % of polyol c using TDA or a mixture of TDA and TEOA as a initiator, and 5~20 wt. % of polyol d having an ester structure. Herein, the amount of each polyol is determined within the above each range so that total wt. % of polyols a, b, c and d could amount to 100.

The reaction catalysts used in the present invention can be classified into three kinds, that is, a foaming catalyst for controlling polyurethane major reaction, a gelling catalyst, and a trimerization catalyst. General pentamethylene diethylene triamine (PMDETA) can be used as the foaming catalyst affecting to reactivity of the foam, and dimethyl cyclohexyl amine (DMCHA) can be used as the gelling catalyst. Relevancy and reactivity between the two catalysts should be set appropriately under actual using conditions, and thereby, these catalysts can affect to the flow and hardness of the foam. Especially, in case that the polyol controls the flow of the foam as in the present invention, the foaming catalyst type should be reduced. Also, in the present invention, the trimerization catalyst may be used additionally, and a mixed catalyst in which the foaming catalyst and the gelling catalyst are mixed at appropriate ratio may be used in this case, preferable mixing ratio (foaming catalyst: gelling catalyst, w/w) is in a range of 1:1~1:3.

The foaming catalyst is used by the amount of 0.3~0.7 weight parts, the gelling catalyst is used by the amount of 1.0~1.5 weight parts, and the trimerization catalyst is used by the amount of 0.3~0.5 weight parts in case of using per polyol 100 weight parts. Also, in case that the mixed catalyst of the foaming catalyst and the gelling catalyst is used, the catalyst is used by the amount of 2.0~3.0 weight parts per polyol 100 weight parts. In economic aspect, it is desirable that the foaming catalyst which has relative high price is reduced.

In the present invention, the organic isocyanate is used as it is used in general polyurethane. For example, diphenylmethane diisocyanate (polymeric MDI) can be used. An index (NCO/OH) for an optical foam is about 1.1~1.2, and the isocyanate is used by the amount of 150~170 weight parts per polyol 100 weight parts.

In the present invention, water is used as a chemical foam blowing agent, and injected by the amount of 1.5~2.5 weight parts per polyol 100 weight parts. The HCFC-141b is used as a physical foam blowing agent, and injected by the amount of about 10~50 weight parts per polyol 100 weight parts.

In addition, a surface active agent may be used in the rigid polyurethane foam composition of the present invention, and, in this case, a silicon surface active agent which is used in general rigid polyurethane can be used. The surface active agent in the present invention reduces a surface tension to improve miscibility, uniformizes the size of generated pores, and stablizes the generated foam by controlling pore structure of the foam. In case that the silicon surface active agent is used in the present invention, it is used by the amount of 1.0~3.0 weight parts per polyol 100 weight parts.

Also, the composition for the rigid polyurethane foam may further includes one or more additives, such as an ignition delay agent, a filler, a strengthened fiber, and a colorant.

Hereinafter, examples and comparative examples of the present invention will be described in detail. In all examples and comparative examples, all "part" and "%" represent "weight part" and "wt. %" unless it is specifically defined.

COMPARATIVE EXAMPLE 1

As shown in table 1, a composition for the rigid polyurethane foam, which consists of polyol 100 weight parts including polyol A obtained by polymerization with alkylene oxide (PO: propylene oxide, EO: ethylene oxide) using sorbitol of hexa-valent functional group as an initiator, polyol B obtained by polymerization with alkylene oxide using toluene diamine (TDA) of tetra-valent functional group as an initiator, polyol C obtained by polymerization with the alkylene oxide using ethylene diamine (EDA) of tetra-valent functional group as an initiator, and polyol D of poly-functional alcohol having ester structure, 2.0~2.5 weight parts of water and 33~35 weight parts of HCFC-141b as foam blowing agents, 0.3~0.5 weight parts of trimerization type and 1.0~1.4 weight parts of mixed type in which PMDETA and DMCHA are mixed as catalysts, 1.5~2.5 weight parts of silicon surface active agent, and 140~150 weight parts of polyisocyanate, was fabricated, on which foaming and hardening were performed to prepare a sample of rigid polyurethane foam.

EXAMPLE 1

As shown in table 1, a composition for the rigid polyurethane foam, which consists of 100 weight parts of polyol compound comprising polyol A, polyol C, polyol D, and polyol E obtained by polymerization with alkylene oxide using EDA of tetra-valent functional group as an initiator, 1.5~2.5 weight parts of water and 25~35 weight parts of HCFC-141b as foam blowing agents, 0.3~0.7 weight parts of PMDETA, 1.2~1.5 weight parts of DMCHA, and 0.3~0.5 weight parts of trimerization type as catalysts, 1.0~3.0 weight parts of silicon surface active agent, and 150~170 weight parts of polyisocyanate, was fabricated, on which foaming and hardening were performed to prepare a sample of rigid polyurethane foam.

EXAMPLE 2

As shown in table 1, a composition for the rigid polyurethane foam, which consists of 100 weight parts of polyol compound comprising polyol A, polyol C, polyol E, and polyol F having ester structure, 1.5~2.5 weight parts of water and 25~35 weight parts of HCFC-141b as foam blowing agents, 0.3~0.5 weight parts of trimerization type 2.0~3.0 weight parts of PMDETA/DMCHA as catalysts, 1.0~3.0 weight parts of silicon surface active agent, and 150~170 weight parts of polyisocyanate, was fabricated, on which foaming and hardening were performed to prepare a sample of rigid polyurethane foam.

EXAMPLE 3

As shown in table 1, a composition for the rigid polyurethane foam, which consists of 100 weight parts of polyol compound comprising polyol A, polyol C, polyol E, and polyol F, 1.5~2.5 weight parts of water and 25~35 weight parts of HCFC-141b as foam blowing agents, 0.3~0.7 weight parts of PMDETA, 1.0~1.3 weight parts of DMCHA, and 0.3~0.5 weight parts of trimerization type as catalysts, 1.0~3.0 weight parts of silicon surface active agent, and 150~170 weight parts of polyisocyanate was fabricated, on which foaming and hardening were performed to prepare a sample of rigid polyurethane foam.

Results of measuring physical properties for the above samples are shown in table 1, and the physical properties in table 1 were measured as follows:

Just Pack: the amount of polyurethane foam when it is precisely filled in a predetermined volume when a raw solution is injected into a predetermined mold, measured by an electronic scale reactivity: a major reaction time of the foam (a time point when fiber is attached to a bar, when a bar is put into the foam in reaction) measured by a stop watch free rise density: density of a foam which is foamed in an opened chamber without being locked in a mold measured by a scale and a device for measuring dimensions k-factor: generally represented as λ, a thermal conductivity of the foam measured by Auto-λ core density: density of a foam which is foamed in a predetermined mold except outer surface portion measured by an electronic scale and a device for measuring dimensions compression strength: a compression strength of foam measured by a universal testing machine (UTM)

dimension changing rate: changes in dimensions according to environment changing (low temperature, high temperature, or high temperature and high humidity). The environmental changes of the form were caused by a thermohydrostat (Korean product, foreign made), and the dimensions before and after the change were measured by using a device for measuring dimensions, to calculate the changing rate post expansion rate: an expanded degree of the foam when the foam is taken out from a mold (demolding) before the foam is totally hardened in the mold (demolding time is reduced), measured as follows, ① Just pack of the raw solution in a mold (jig) of reference size is measured.

② The raw solution is injected into the mold as overpacking (more than 20%) on a basis of above measured just pack.

③ A center of the foam is expanded because the hardening time is shortened than a standard hardening time (staying time in the mold), and the expanded amount comparing to a standard thickness (mold thickness), when the foam is demolded, is measured using a device for measuring dimensions to calculate the expansion rate.

mal insulating material. In addition, according to the present invention, the post-expansion rate is reduced, and thereby, the changed amount of outer dimension and the demolding time are reduced to improve productivity of the form. Especially, as in examples 1 and 3, according to the compositions in which the polyol advantageous to flow is included and the catalyst of foaming agent type of high cost is reduced, the cost-saving effect for the thermal insulating material can be obtained. Therefore, preferable compositions are the above examples 1 and 3.

INDUSTRIAL APPLICABILITY

As described above, according to the composition for preparing the rigid polyurethane foam of the present invention, the rigid polyurethane foam which is able to maintain required physical properties to be same levels as those of the conventional art, and to minimize post-expansion rate can be fabricated. In addition, as the post-expansion rate is minimized, hardening time in a foaming jig after the raw solution is injected, and thereby the productivity can be increased when the polyurethane foam is applied to the refrigerator, etc. Also, since the changed amount of the foam can be reduced when it is applied to various products, the size of the product can be managed precisely, and therefore, industrial applicability of the present invention is superior to conventional art.

As the present invention may be embodied in several forms without departing from the spirit or essential characteristics thereof, it should also be understood that the above-described embodiments are not limited by any of the details

TABLE 1

| | | Comparative example 1 | Example 1 | Example 2 | Example 3 |
|---|---|---|---|---|---|
| Polyol | Polyol A (%) | 30–50 | 40–60 | 40–60 | 40–60 |
| | Polyol B (%) | 30–40 | None | None | None |
| | Polyol C (%) | 10–20 | 5–10 | 10–20 | 5–10 |
| | Polyol D (%) | 10–20 | 5–10 | None | None |
| | Polyol E (%) | None | 20–30 | 25–35 | 20–30 |
| | Polyol F (%) | None | None | 10–20 | 10–20 |
| | PMDETA (part) | None | 0.3–0.7 | None | 0.3–0.7 |
| | DMCHA (part) | None | 1.2–1.5 | None | 1.0–1.3 |
| Catalyst | Trimerization type (part) | 0.3–0.5 | 0.3–0.5 | 0.3–0.5 | 0.3–0.5 |
| | PMDETA/DMCHA (part) | 1.0–1.4 | None | 2.0–3.0 | None |
| Foam blowing agent | Water (part) | 2.0–2.5 | 1.5–2.5 | 1.5–2.5 | 1.5–2.5 |
| | HCFC-141b | 33–35 | 25–35 | 25–35 | 25–35 |
| Silicon surface active agent (part) | | 1.5–2.5 | 1.0–3.0 | 1.0–3.0 | 1.0–3.0 |
| Polyisocyanate (isocyanate index)(part) | | 140–150 (1.14–1.20) | 150–170 (1.1–1.2) | 150–170 (1.1–1.2) | 150–170 (1.1–1.2) |
| Physical properties | Just Pack (g) | 482 | 483 | 477 | 486 |
| | k-factor (kcal/mhr° C.) | 0.0154 | 0.0154 | 0.0154 | 0.0154 |
| | Core density (kg/m$^2$) | 29.04 | 28.99 | 28.51 | 29.66 |
| | Compression strength (kg/m$^2$) | 1.47 | 1.34 | 1.39 | 1.41 |
| | Post expansion (%) | 2.78 | 1.26 | 1.43 | 1.30 |
| | Low temp. dimension changing rate (%) | 0.68 | 0.75 | 0.72 | 0.75 |
| | High temp. dimension changing rate (%) | 0.15 | 0.19 | 0.22 | 0.33 |

The rigid polyurethane foam fabricated from the above composition according to the present invention is able to maintain the required physical properties (thermal insulating function, strength, dimension changing rate, etc.) as a thermal insulating material.

of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A composition for preparing a rigid polyurethane foam comprising:
   a mixed polyol 100 weight parts comprising 40–60 wt. % of polyol (a) which is obtained by polymerization with an alkylene oxide using sorbitol as an initiator, 5~10 wt. % of polyol (b) which is obtained by polymerization with an alkylene oxide using ethylene diamine as an initiator, 20~30 wt. % of polyol (c) which is obtained by polymerization with an alkylene oxide using toluene diamine as a single initiator or a mixture of toluene diamine and triethanol amine as a complex initiator, and 5~20 wt. % of multivalent polyol (d) of an ester structure, on a basis of total weight of mixed polyol;
   1.6~3.5 weight parts of reaction catalyst component including 0.3~0.7 weight parts of a foaming catalyst, 1.0~1.5 weight parts of a gelling catalyst and 0.3~0.5 weight parts of a trimerization catalyst, per polyol 100 weight parts;
   10~50 weight parts of a foam blowing agent;
   1.5~2.5 weight parts of water; and
   150~170 weight parts of an organic isocyanate.

2. The composition of claim 1, wherein the alkylene oxide is selected from the group consisting of ethylene oxide, propylene oxide, and a mixture thereof.

3. The composition of claim 1, wherein the foaming catalyst is pentamethyl diethylene triamine.

4. The composition of claim 1, wherein the gelling catalyst is dimethyl cyclohexyl amine.

5. The composition of claim 1, comprising the mixed catalyst in the amount of 2.0~3.0 weight parts, per polyol 100 weight parts.

6. The composition of claim 1, wherein an index of the organic isocyanate (NCO/OH) is 1.1~1.2.

7. The composition of claim 1, wherein the foam blowing agent is HCFC-141b.

8. The composition of claim 1 further comprising a silicon surface active agent in the amount of 1.0~3.0 weight parts per polyol 100 weight parts.

9. The composition of claim 1 further comprising one or more additives selected from the group consisting of an ignition delay agent, a filler, a strengthened fiber, and a colorant.

10. A rigid polyurethane foam having superior demolding property fabricated from the composition according to claim 1.

* * * * *